(12) United States Patent
Spindler et al.

(10) Patent No.: US 11,837,930 B2
(45) Date of Patent: Dec. 5, 2023

(54) POLYPHASE WINDING PACK WITH OVERLAPPING COILS

(71) Applicant: Elinco International JPC, Inc., Fairfield, CT (US)

(72) Inventors: Ryan Spindler, Sandy Hook, CT (US); Sean Parzuchowski, Shelton, CT (US)

(73) Assignee: Elinco International JPC, Inc., Fairfield, CT (US)

( * ) Notice: Subject to any disclaimer, the term of this patent is extended or adjusted under 35 U.S.C. 154(b) by 2 days.

(21) Appl. No.: 17/396,418

(22) Filed: Aug. 6, 2021

(65) Prior Publication Data

US 2023/0043481 A1 Feb. 9, 2023

(51) Int. Cl.
*H02K 3/28* (2006.01)
*H02K 3/12* (2006.01)
*H02K 3/32* (2006.01)

(52) U.S. Cl.
CPC ............. *H02K 3/28* (2013.01); *H02K 3/12* (2013.01); *H02K 3/32* (2013.01)

(58) Field of Classification Search
CPC .. H02K 3/00; H02K 3/04; H02K 3/18; H02K 3/47; H02K 15/0025; H02K 15/04; H02K 15/0435; H02K 15/0442; H02K 15/045
USPC .......................... 310/180, 194, 198–208, 266
See application file for complete search history.

(56) References Cited

U.S. PATENT DOCUMENTS 5,294,855 A 3/1994 Mihalko
8,829,756 B2 9/2014 Suzuki et al.

FOREIGN PATENT DOCUMENTS

| CN | 102761225 A | 10/2012 |
|---|---|---|
| CN | 202663207 U | 1/2013 |
| CN | 202696383 U | 1/2013 |
| CN | 202918166 U | 5/2013 |
| CN | 204696895 U | 10/2015 |
| CN | 204761191 U | 11/2015 |
| CN | 206117337 U | 4/2017 |
| CN | 206117421 U | 4/2017 |
| CN | 206117464 U | 4/2017 |
| CN | 207069723 U | 3/2018 |
| CN | 207490651 U | 6/2018 |
| CN | 208782661 U | 4/2019 |
| CN | 208986806 U | 6/2019 |
| FR | 2481856 A1 | 11/1981 |
| GB | 678023 A | 8/1952 |
| JP | 2001275316 A | 10/2001 |
| WO | 2020005221 A1 | 1/2020 |

OTHER PUBLICATIONS

International Search Report and Written Opinion for International Application No. PCT/US22/74521, filed Aug. 4, 2022, dated Nov. 11, 2022.

*Primary Examiner* — Tran N Nguyen
*Assistant Examiner* — Minki Chang
(74) *Attorney, Agent, or Firm* — Fox Rothschild LLP

(57) ABSTRACT

An electric motor polyphase winding pack includes a plurality of coiled conductors, each of the coiled conductors corresponding to a phase of a plurality of phases. Each of the coiled conductors has a first side and a second side. The coiled conductors are arranged in a sequence in which all of the first sides are disposed sequentially in a first layer, and all of the second sides are arranged in second layer disposed adjacent to the first layer, such that some of the first sides in the first layers and some of the second sides in the second layer correspond to each phase of the plurality of phases.

27 Claims, 9 Drawing Sheets

900

For each phase of the polyphase winding, wind a first conductor for a number of turns in a first direction such that each turn of the first conductor is adjacent a next turn of the first conductor to form a coil.
902

Arrange the formed coils in a sequence, wherein a first side of each of the coils is disposed in a first layer of the polyphase winding and a second side of each of the coils is disposed in a second layer of the polyphase winding.
904

Apply a position-maintaining element to the coils in each layer, the position-maintaining element configured to maintain the relative positions of each of the coils in the sequence within each layer.
906

FIG.9

POLYPHASE WINDING PACK WITH OVERLAPPING COILS

FIELD OF INVENTION

This invention relates to field windings for electrical machines and methods for forming field windings.

BACKGROUND OF THE INVENTION

An electric motor develops torque by keeping the magnetic fields of the rotor (the rotating part of the machine) and the stator (the fixed part of the machine) misaligned. The misalignment generates a torque that tries to realign the fields. One or both of the rotor and stator includes electromagnets, e.g., magnets formed of coils of wire. A brushless DC electric motor, also known as an electronically commutated motor, uses a controller to switch currents to the motor windings to produce magnetic fields. The controller adjusts the phase and amplitude of the DC current to control the speed and torque of the motor. A linear motor is an electric motor with its stator and rotor "unrolled" thus instead of producing a torque (rotation) it produces a linear force along its length.

The construction of a brushless motor system is typically similar to a permanent magnet synchronous motor, using permanent magnets embedded in a steel rotor and an electromagnetic stator producing a rotating magnetic field. The rotor may use rare earth magnets and be an outrunner (the stator is surrounded by the rotor), an inrunner (the rotor is surrounded by the stator), or axial (the rotor and stator are flat and parallel). The stator may be slotted, e.g., made up of windings inserted in slots between "teeth" which shape the magnetic fields. The stator may also be slotless, consisting of self-supporting windings separated from the rotor by an air gap. The stator may be located between the rotor and the outer case of the motor and held in place with epoxy resin. The primary benefit of a slotless motor design is that the lack of teeth in the lamination eliminates cogging torque and results in a motor with smooth-running characteristics. Reducing the cost and/or complexity of forming field windings for electric motors may also be advantageous.

SUMMARY OF THE INVENTION

The summary is illustrative only and is not intended to be in any way limiting. In addition to the illustrative aspects, embodiments, and features described above, further aspects, embodiments, and features will become apparent by reference to the drawings and the following detailed description.

In accordance with various embodiments, an electric motor polyphase winding pack includes a plurality of coiled conductors, each of the coiled conductors corresponding to a phase of a plurality of phases. Each of the coiled conductors has a first side and a second side. The coiled conductors are arranged in a sequence in which all of the first sides are disposed sequentially in a first layer and all of the second sides are arranged in second layer which is adjacent to the first layer, such that some of the first sides in the first layer and some of the second sides in the second layer correspond to each phase of the plurality of phases. The electric motor polyphase winding pack also includes a position-maintaining member associated with the coiled conductors of each layer to maintain the relative positions of each of the plurality of coiled conductors in the sequence within each layer. The position-maintaining member may include adhesive tape that extends between the layers.

Implementations of the disclosure may include one or more of the following optional features. In some examples, the first and second layers abut. The first and second layers may be parallel to each other. The first and second sides may be generally parallel to each other. At least some of the second sides may (at least partially) overlap at least some of the first sides. In some examples, the first sides are spaced from one another by gaps. The second sides may have a second side width (measured in a direction along the sequence) which is wider than the width of the gaps, such that at least some second sides each overlap the gaps and the first sides. In some examples, the second sides are spaced from one another by gaps. The first sides may have a first side width (measured in a direction along the sequence) which is wider than the width of the gaps, such that at least some first sides each overlap the gaps and the second sides. In some examples, each of the first and second layers has opposite first and second ends, where the first end of the first layer extends beyond the first end of the second layer and the second end of the second layer extends beyond the second end of the first layer. The first end of the first layer may extend beyond the first end of the second layer by a distance defined by a length of an end of a coil. The first end of the first layer may extend beyond the first end of the second layer by the same distance as the second end of the second layer extends beyond the second end of the first layer.

In some examples, the first layer has a first end region extending beyond the first end of the second layer, the second layer has a second end region extending beyond the second end of the first layer, and the same number of first sides is disposed in the first end region as second sides disposed in the second end region. In some examples, the winding pack is rolled into a configuration having the first and second end regions overlap. The winding pack may be rolled with only the first and second end regions overlapping, with the first and second ends of the first layer disposed circumferentially adjacent each other and the first and second ends of the second layer disposed circumferentially adjacent each other. The first layer may be disposed outside the second layer providing an outer layer, such that the second layer provides an inner layer. Some of the first and second sides may have circumferential widths that are different from each other. In some examples, at least one of the second sides extends into a gap between the first sides and partially overlaps one of the first sides. In some examples, the first and second layers are separated by an irregular interlayer boundary.

Another aspect of the disclosure provides an electric motor. The motor includes a stator and a rotor, the rotor movable with respect to the stator and configured to deliver force produced by the motor. One of the stator and the rotor includes a plurality of magnets and the other of the stator and the rotor includes the winding pack disclosed above, the winding pack electromagnetically associated with the magnets to produce the force. The rotor may be rotatable within the stator and may be configured to deliver a torque produced by the motor. In some examples, the plurality of coiled conductors includes (for each phase of the plurality of phases) a first coil and a second coil. The first coil and the second coil may be electrically connected to cause current to flow in opposite directions in the first side of the first coil and the first side of the second coil.

Another aspect of the disclosure provides a method of winding a 2-layer polyphase winding. The method includes (for each phase of the polyphase winding) winding a first conductor for a number of turns such that each turn of the first conductor is adjacent a next turn of the first conductor to form a coil. The method further includes arranging the formed coils in a sequence, wherein a first side of each of the coils is disposed in a first layer of the polyphase winding and a second side of each of the coils is disposed in a second layer of the polyphase winding. The method also includes applying a position-maintaining element to the coils in each layer, the position-maintaining element configured to maintain the relative positions of each of the coils in the sequence within each layer.

Implementations of the disclosure may include one or more of the following optional features. The position-maintaining element may include an adhesive tape which adheres to the coils. In some examples, the method includes rotating each of the coils around a longitudinal axis (while the position-maintaining element maintains the spacing between adjacent coils) to form a winding pack, with the first layer of the winding pack including conductors of the first side of each coil, and the second layer of the winding pack including conductors of the second side of each coil. The method may include rolling the winding pack into a cylindrical configuration, the longitudinal axis of the cylindrical configuration substantially parallel with the longitudinal axis of the coils.

In some examples, the method includes winding the coils around a winding fixture including one or more winding positions. The method may include applying the position-maintaining element to the winding fixture prior to winding the coils. Winding the coils may include rotating the winding fixture about its axis. The winding fixture may also include a spacing element configured to receive electrical conductors as the electrical conductors are wound into coils. The spacing element may define a distance between adjacent coils as the electrical conductors are wound. The spacing element may include a plurality of notches defining the distance between adjacent coils. In some examples, the spacing element includes a pair of removable combs separated by a movable center element. Removing the coils from the winding fixture may include moving the center element to allow the pair of combs to move toward each other to release the coils.

BRIEF DESCRIPTION OF THE DRAWINGS

FIG. 9 is an example of an arrangement of operations for forming the winding pack.

Like reference symbols in the various drawings indicate like elements.

DETAILED DESCRIPTION

Figure 1:
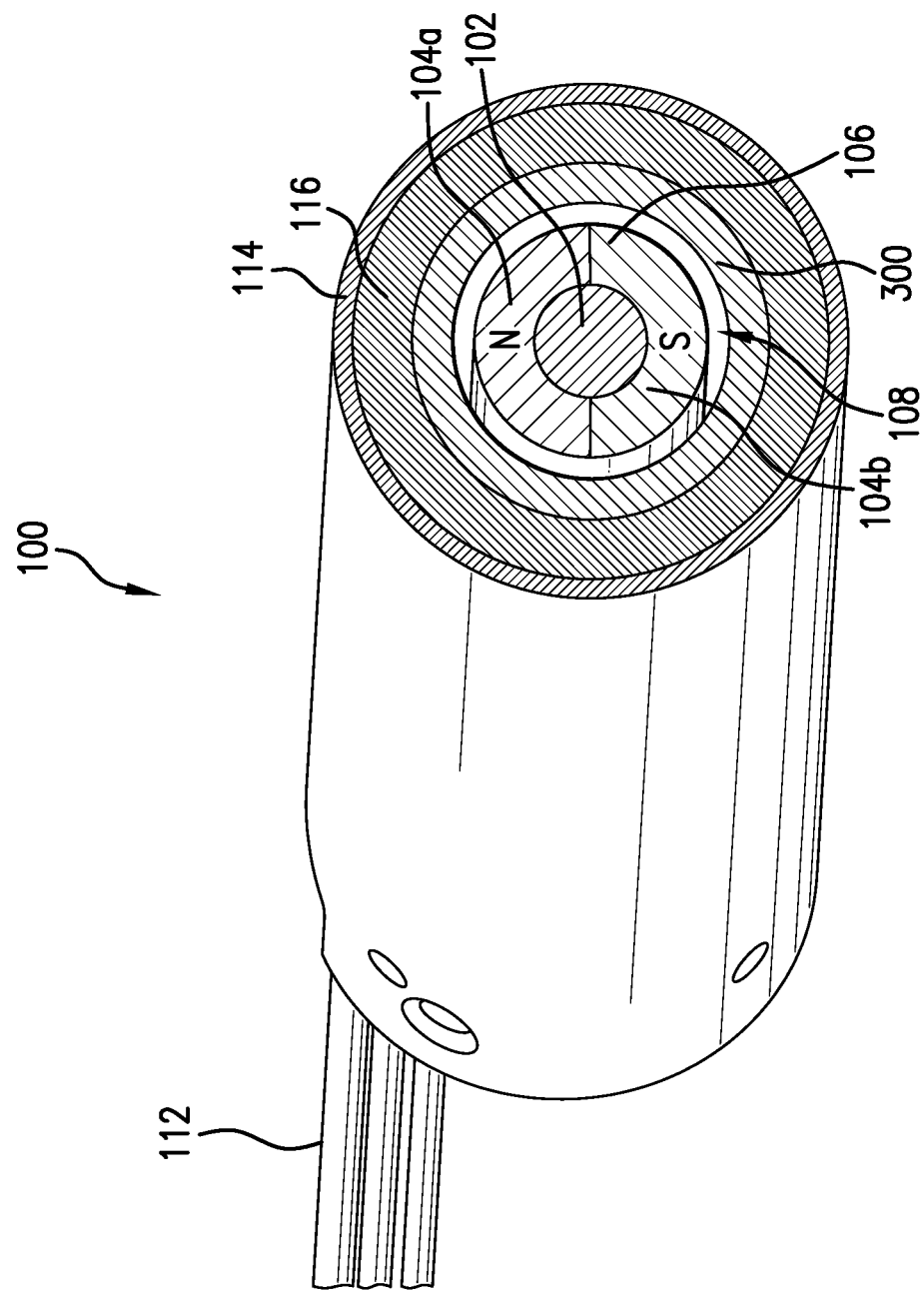
FIG. 1 is a cutaway view of an embodiment of a slotless electric motor.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are implicitly contemplated herein.

The present disclosure relates generally to field windings for electrical machines and methods for forming field windings. Some aspects of the present disclosure are directed to polyphase field windings for electric motors. Electric motors typically have a stationary component (stator) which interacts magnetically with a rotating component (rotor) to produce a torque. Torque is produced when the magnetic fields of the rotor and the stator are misaligned. A linear motor is essentially an electric motor with its stator and rotor "unrolled" thus instead of producing a torque (rotation) it produces a linear force, but the same principle applies. In both linear and rotating motors, one or both of the stator and the rotor are electromagnets, using energized coils of conductors (windings) to produce magnetic fields. A polyphase motor winding includes two or more coils of electrical conductors where the voltage applied to each coil of conductors has a defined phase relationship with the voltage applied to the other coils. For a three-phase system, the phase angle is typically 120 degrees. Polyphase motor windings have application in a variety of motor configurations, include Alternating Current (AC) synchronous motors and electronically commutated Direct Current (DC) motors (brushless DC motors). A brushless DC motor is essentially a synchronous motor using an electronic closed loop controller to adjust the frequency and amplitude of the current in the polyphase motor winding to control the speed and torque of the motor. In both AC synchronous and DC brushless motors, the polyphase motor windings typically produce a rotating magnetic field which drives a permanent-magnet rotor. An AC synchronous motor is termed "doubly fed" if it includes electromagnets on both the rotor and stator.

Referring to FIG. 1, a cutaway view of an example, three-phase DC brushless motor 100 is shown. At the center of the motor 100 is a rotating shaft 102 supported by bearings (not shown). One or both ends of the rotor shaft 102 may be transversely adjusted to align the rotational axis of the rotor shaft 102 with the center of the motor 100. Here, permanent magnets 104, 104a, 104b having a single magnetic pole pair (North, South) are attached to the rotor shaft 102 so that when magnetic forces are applied to the permanent magnets 104, the permanent magnets 104 apply torque to the rotor shaft 102. Pins (not shown) extend from the rotor shaft 102 at least part way into the magnets 104 to prevent the magnets 104 from rotating with respect to the rotor shaft 102. The magnets 104 are enclosed in a cylindrical sleeve 106, securing the magnets 104 to the pins. The magnets 104 may be secured together by screws and/or screwed directly to the rotor shaft 102. In some examples, the rotor 102 includes two, four, or a higher count of magnetic pole pairs, e.g., for greater precision of motion.

Figure 2:
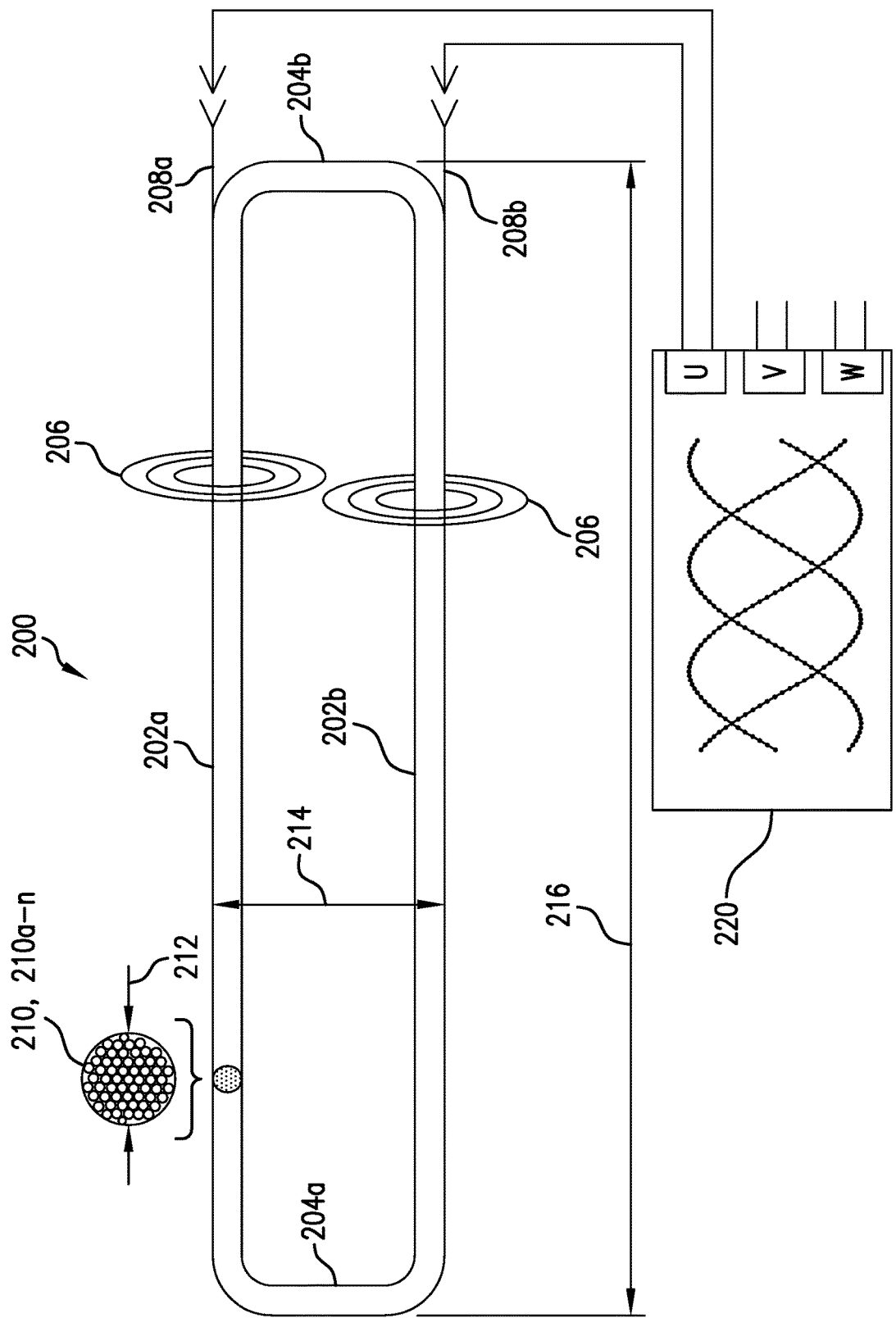
FIG. 2 is a schematic diagram of a coil of conductors used in the electric motor of FIG. 1.

The stator field winding pack 300 (FIG. 3) surrounds the rotor 102 and is separated from the rotor 102 by an air gap 108. There may be an insulating member covering the winding pack 300, preferably a thin sheet of insulating material to reduce the effect on the magnetic fields 206. In some examples, the insulating member is a sheet of Kapton, Nomex, mylar, or a combination of these materials. The stator field winding pack 300 includes coils 200 of conductors 210 (FIG. 2) that produce magnetic fields 206 when supplied with electrical current. Electrical current may be supplied through wiring 112 that brings current from an external power source to the field windings 300 of the motor 100. The field windings 300 may be energized by current from an AC source, such as a polyphase electric power source 220 (FIG. 2). The electric power source may be a wide-area electrical power grid operating at a frequency of, e.g., 60 Hz or 50 Hz. In some examples, the field windings 300 are energized by current from a commutated DC power source, e.g., using a brushed commutator to periodically switch the direction of the DC current. In some examples, the field windings 300 are energized by an electronic closed loop controller switching DC currents to the field windings 300, e.g., to control the speed and torque of the motor 100. The motor 100 of FIG. 1 is enclosed within a stainless-steel case 114. Within the stainless-steel case 114 are iron laminations 116 configured to reduce losses due to eddy currents generated by changing magnetic fields 206. The stator field winding pack 300 may be secured in place within the iron laminations 116 by a solid or gelatinous compound such as an epoxy resin, which also serves to exclude contaminants, such as moisture. In some examples, the stator field winding pack 300 is positioned within the iron laminations 116 using a positioning element 304 (FIG. 3) such as an adhesive tape before being secured by the epoxy resin. In some examples, the positioning element 304 remains in the motor 100 after the stator field winding pack 300 is secured in place. In these examples, a low volume positioning element 304 increases the usable area for the winding pack 300. A feature of the slotless motor 100 shown is the lack of stator "teeth" in the iron laminations 116, which also increases the usable area for the winding pack 300, allowing a more compact motor 100 configuration. Stator field winding packs 300 which are compact and efficient to produce and install provide additional advantages.

Referring to FIG. 2, a schematic top view of an example coil 200 for a field winding 300 is shown. Here, the coil 200 has a length 216 defined by two coil sides 202a, 202b, and a width 214 defined by coil ends 204a, 204b that cross over between the coil sides to enable electrical current to flow from each coil side to the other via the coil ends. Typically, the coil sides are significantly longer than the coil ends, but in some embodiments these relative lengths can be different. When installed in an electric motor 100 such as the three-phase DC brushless motor 100 of FIG. 1 (either within a stator winding or a rotor winding), the sides 202a, 202b of the coil 200 may be approximately parallel to the rotational axis of the rotor 102. The ends 204 of the coils 200 may occupy available space beyond the ends of the permanent magnets 104 of the rotor 102. In some embodiments, the sides 202a, 202b of the coil 200 are somewhat skewed from parallel to achieve smoother operation of the motor 100 or for other purposes. Each coil 200 includes of a number of turns of electrical conductors 210, 210a-n, shown here in a detail view of a cross section of one side 202a of the coil 200. Here, the tightly packed conductors 210 define a side width 212 of the roughly circular cross-section of a side 202a of the coil 200. The cross-section may also be oblong or oval in various embodiments. In some examples, the shape of the cross section of the coil 200 may be flattened into an irregular shape conforming to available space when formed into a winding pack 300 with other coils 200 and/or when installed in an electrical motor 100.

The conductors 210 form a closed loop, so that subsequent turns of the conductor 210 are adjacent to previous turns. The coil 200 may be formed by winding conductors 210 around a mandrel 502 (FIG. 5), jig, or other fixture. Dimensions of the mandrel 502 may define the length 216 and width 214 of the coil 200, and the cross-sectional shape and area of each side 202 of the coil 200. The coil 200 dimensions may be further modified after winding, e.g., as one or more coils 200 are formed into a winding pack 300. To reduce the likelihood of short circuits between adjacent conductors 210, The conductors 210 may be covered or jacketed with an insulating material, such as a polyvinyl chloride (PVC). The insulating material should preferably withstand temperatures in the range from −40 to 150 degrees C., although other embodiments can be constructed to operate outside this range. The conductors 210 may be, for example, copper, aluminum, or other metal having low room-temperature resistance, or the conductors 210 may be a superconducting material, such as a niobium alloy.

An electric power supply may be electrically connected to exposed leads 208a, 208b of the electrical conductors 210 to energize the coil 200, producing a magnetic field 206 surrounding electrical conductors 210 of the coil 200. The strength of the magnetic field 206 is related to the amount of current flowing in the conductors 210 and the number of turns of electrical conductors 210 in the coil 200, according to known principles of electromagnetism. Here, due to the closed-loop configuration of the coil 200, current flowing through each conductor 210 in one side 202a of the coil 200 returns through the coil ends 204 to flow in the opposite direction in each conductor 210 of the other side 202b. The resulting magnetic field 206 in the volume between the sides 202 of the coil 200 includes the sum of the magnetic fields 206 produced by current flowing in each conductor 210 of each side 202 of the coil 200.

Commercially available conductors 210 typically have standard current-carrying capacities, and an associated cross-sectional area, based on the material of the conductor 210. For example, the electrical conductors 210 may be copper wire in American Wire Gauge (AWG) gauges between 16 and 13, having ampacity between approximately 10 and 15 amps and cross-sectional areas between approximately 1.3 and 2.6 mm$^2$. Relatively thinner conductors 210 are associated with relatively greater flexibility, ease of handling, and dense packing, but relatively smaller current-carrying capacity, requiring a larger number of turns to achieve a similar magnetic field 206 strength. In some examples, several insulated conductors 210 (or several strands of conductors 210 jacketed in a single insulator) may be used to form the coil 200. In this way, a balance may be struck between current-carrying capacity and ease of handling of commercially available conductors 210 to achieve a magnetic field 206 strength.

A polyphase winding pack 300 for an electric motor 100 may have more than one coil 200 per electrical phase, although some embodiments have only a single coil per electrical phase. Each phase of coils 200 in these embodiments is energized by separate phases of a polyphase power source 220, and therefore the separate coils 200 are energized by separate phases of the polyphase power source 220. The polyphase power source 220 of FIG. 2 is a three-phase power source providing sinusoidal outputs with phases (designated U, V, and W) separated by 120 degrees. The outputs may be electronically commutated by circuitry of an electric motor 100 to control the speed and torque of the motor 100. Other suitable waveforms and power sources are also suitable for energizing coils 200 of the winding pack 300. In some examples, the coils 200 are electrically connected to a three-phase power source in a Wye (Y) or a Delta configuration. Some coils 200 may be electrically connected to each phase of the three-phase power source 220. Here, the coil 200 is electrically connected to phase U of the three-phase power source 220. Each coil 200 preferably has the same number of turns as each other coil 200, so that each coil 200 produces a similar strength magnetic field 206 when energized by a similar electrical current. However, embodiments may include coils 200 having different numbers of turns. To achieve symmetric magnetic fields 206 for each phase using coils 200 having equal numbers of turns, the polyphase winding pack 300 preferably includes of an equal number of coils 200 per each phase. In an example, the winding pack 300 for a three-phase electric motor 100 having a rotor 102 with one magnetic pole pair 104 (e.g., a rotor 102 having a magnetic North pole and a magnetic South pole) may include six coils 200, two coils 200 per phase. The winding pack 300 for a three-phase electric motor 100 having a rotor 102 with a greater number of pole pairs 104 may include twelve coils 200, twenty-four coils 200, or other multiple of three coils 200.

Figure 3:
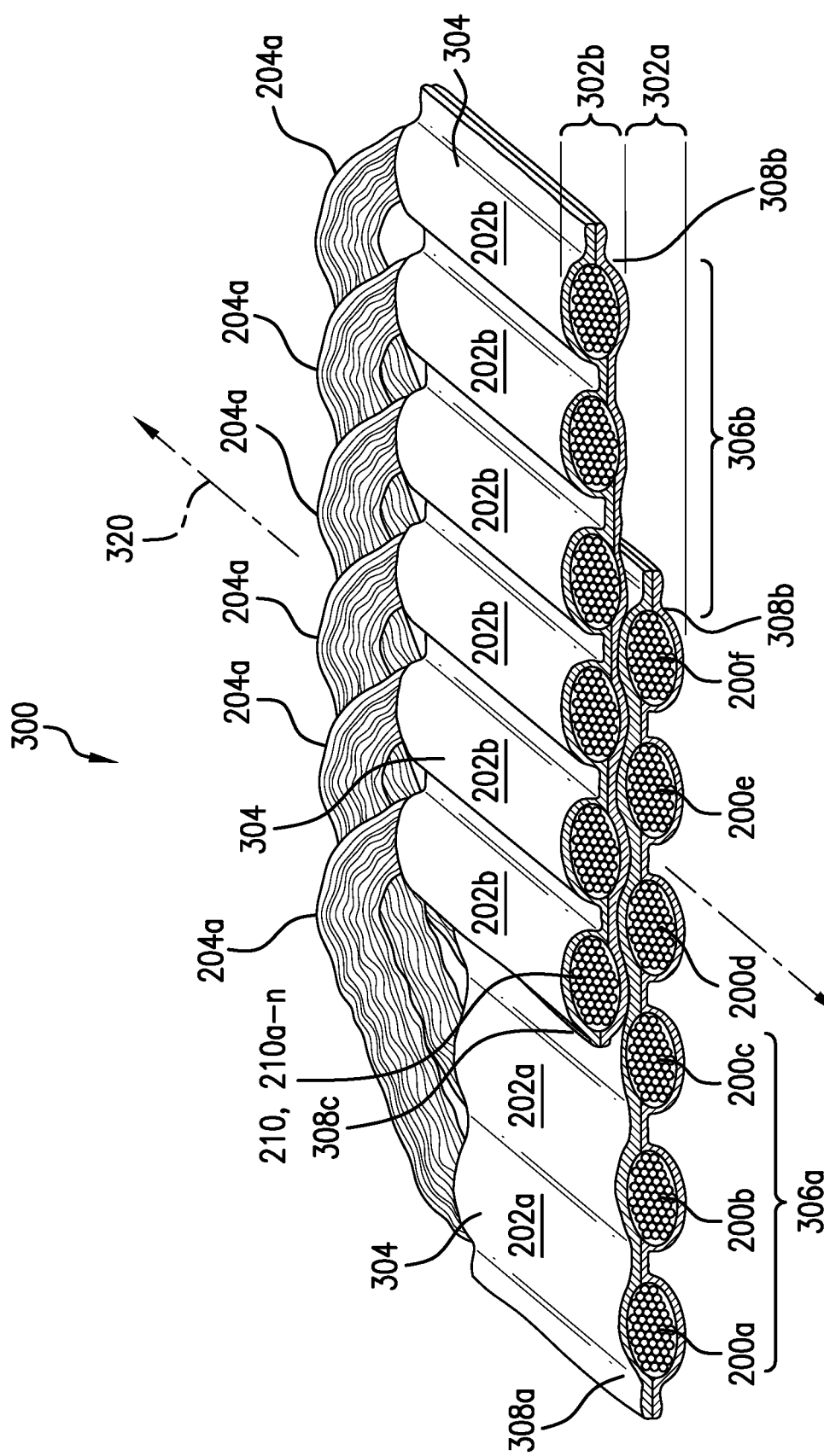
FIG. 3 is a cross-sectional view of a winding pack including six coils of conductors used in the motor of FIG. 1.

Referring to FIG. 3, a schematic diagram of the winding pack 300 for a motor 100, such as the three-phase DC brushless motor of FIG. 1, is shown. The cross section shows a portion of each side 202 of each coil 200 of conductors 210 and the coil ends 204 through which current flows between each side 202 of each coil 200. Here, the winding pack 300 includes an arrangement of six coils 200, 200a-f of conductors 210. Details are exposed of the conductor 210 arrangement within one side 202b of one of the coils 200a. The coils 200 are arranged in a two-layer 302 configuration such that one side 202a of each of the coils 200 cumulatively form one layer (shown as a lower layer 302a) of the winding pack 300, and the other side 202b of each of the coils 200 cumulatively form another layer (shown as an upper layer 302b) of the winding pack 300, with the upper and lower layers 302, 302a, 302b being generally parallel to each other in this embodiment and with the upper layer 302b resting immediately on top of or adjacent to the lower layer 302a.

The coil ends 204 cross over between one layer 302a and the other layer 302b on opposite ends of the coil sides 202. The length of the coil ends 204 is selected to space one coil side 202a of each coil 200 on one layer 302a from the opposite coil side 202b of the corresponding coil 200 on the other layer 302b by a predetermined number of coil sides, or by a predetermined number of coil side widths 212, counted on that same layer 302a or counted on the other layer 302b.

In the embodiment shown, the coil sides 202 of each coil 200 on opposite layers 302 are spaced by between about 2.5 and 3 coil side widths 212, resulting in coil end regions 306a, 306b that include a fraction under 3 coil sides 202 and two of the gaps 510 (FIG. 5) between coils 200. Other embodiments can have different spacings between coil sides 202 of each coil 200. In some embodiments, the spacing is selected so that the coil sides 202 of different coils are stacked aligned directly over a coil side on the opposite layer, and in other embodiments, such as the one shown, the spacings are selected to that the stacked coil sides 202 are partially offset from each other.

In some examples, the relative position of each coil 200 included in each layer 302 is maintained by a position-maintaining element 304. The position-maintaining element 304 may be composed of a non-magnetic material, such as plastic or rubber, and preferably a material which can be easily formed into shape and/or position when applied to the coils 200. Typically, the position-maintaining element 304 is selected to provide good electrical insulation. The position-maintaining element 304 preferably occupies a small volume and readily grips, connects to, or adheres to each coil 200, such as a molded plastic band having dedicated fasteners for each coil. In some examples, the position-maintaining element 304 is an epoxy resin.

In the embodiment shown, for each layer 302, an adhesive tape extends over and under a portion of the side 202 of each coil 200 included in the layer 302 to maintain the relative position of each coil 200 within the layer 302. Because the tape surrounds the coils on both sides, there are two layers of tape between each layer 302a of coils 200. To achieve a small volume, the tape may be as narrow as reasonably possible to maintain the relative position of each coil 200, and/or the position of the tape may be offset between the layers 302a, 302b so that there is only one layer of tape between the layers 302a, 302b of coils 200. In some examples, the gap 510 (FIG. 5) between sides 202 of the coils 200 is smaller than the width 212 of the side 202 of the coil 200. In some examples, the gap 510 between sides 202 of the coils 200 is sufficiently large that at least some conductors 210 of one or both layers 302 may overlay and extend into the gaps 510 of the other layer 302, and may form an irregular inter-layer boundary, e.g., to achieve a more compact configuration.

Each layer 302 in the embodiment shows includes an end region 306 extending beyond the end 308 of the other layer 302. The end regions 306 begin at the furthest extent of coils 200 in the other layer 302. End region 306a of the lower layer 302a extends beyond the end 308c of the upper layer 302b to the left, and end region 306b of the upper layer 302b extends beyond the end 308b of the lower layer 302a to the right. The position-maintaining element 304 may extend beyond the last coil 200 in each layer 302 and into the end region 306. The end regions 306 of each layer 302 may be a similar length and/or include a similar number of coil sides 202. The end regions can have a number of coil sides 202 and lengths selected to enable the winding pack 300 to be wound or rolled with the ends 308 of each layer 302 adjacent each other so that each layer forms a continuous closed shape, such as a cylinder in which the coil sides 202 are spaced regularly around the cylinder. The end regions 306 shown include between about 2.5 and 3 coil side widths 212, although other suitable numbers of coil sides can be included in each end region in other embodiments. The number of coil sides 202 in each end region can be selected by adjusting the length of the coil ends 304, as explained above.

In some examples, the winding pack 300 may be rolled into a cylindrical two-layer configuration. The example winding pack 300 shown in FIG. 3 may be rolled so that one layer 302a becomes an outer layer 306a of the cylindrical configuration, and the other layer 302b becomes an inner layer 306b of the circular configuration, e.g., to be used as a winding pack 300 for the stator or the rotor 102 of the electric motor 100 of FIG. 1. In the resulting circular configuration, the ends 308 of each layer 302 may become adjacent to each other, with the end regions 306 of each layer 302 overlapping each other, such that the outer layer 302a includes one side 202a of each coil 200 and the inner layer 302b includes the other side 202b of each coil 200. The spacing between sides 202 of each coil 200 with each layer 302 continues to be maintained by the position-maintaining element 304, and the relative positions of opposite sides 202 of coils 200 in each layer 302 continues to be defined by the length of the coil ends 204. In some embodiments, the winding pack 300 shown in FIG. 3 may be joined with other winding packs 300 with the end regions 306 of each winding pack 300 overlapping each other, e.g., to form an arbitrarily long field winding 300. The cumulative field windings can be rolled with the ends 308 thereof adjacent each other in a cylindrical or other rolled configuration, as described above but including a greater number of coils 200, e.g., for use in an motor 100 having a rotor 102 with a higher number of magnetic pole pairs 104. Or the ends 308 can remain free of each other, for example for use as a linear motor winding pack.

Figure 4:
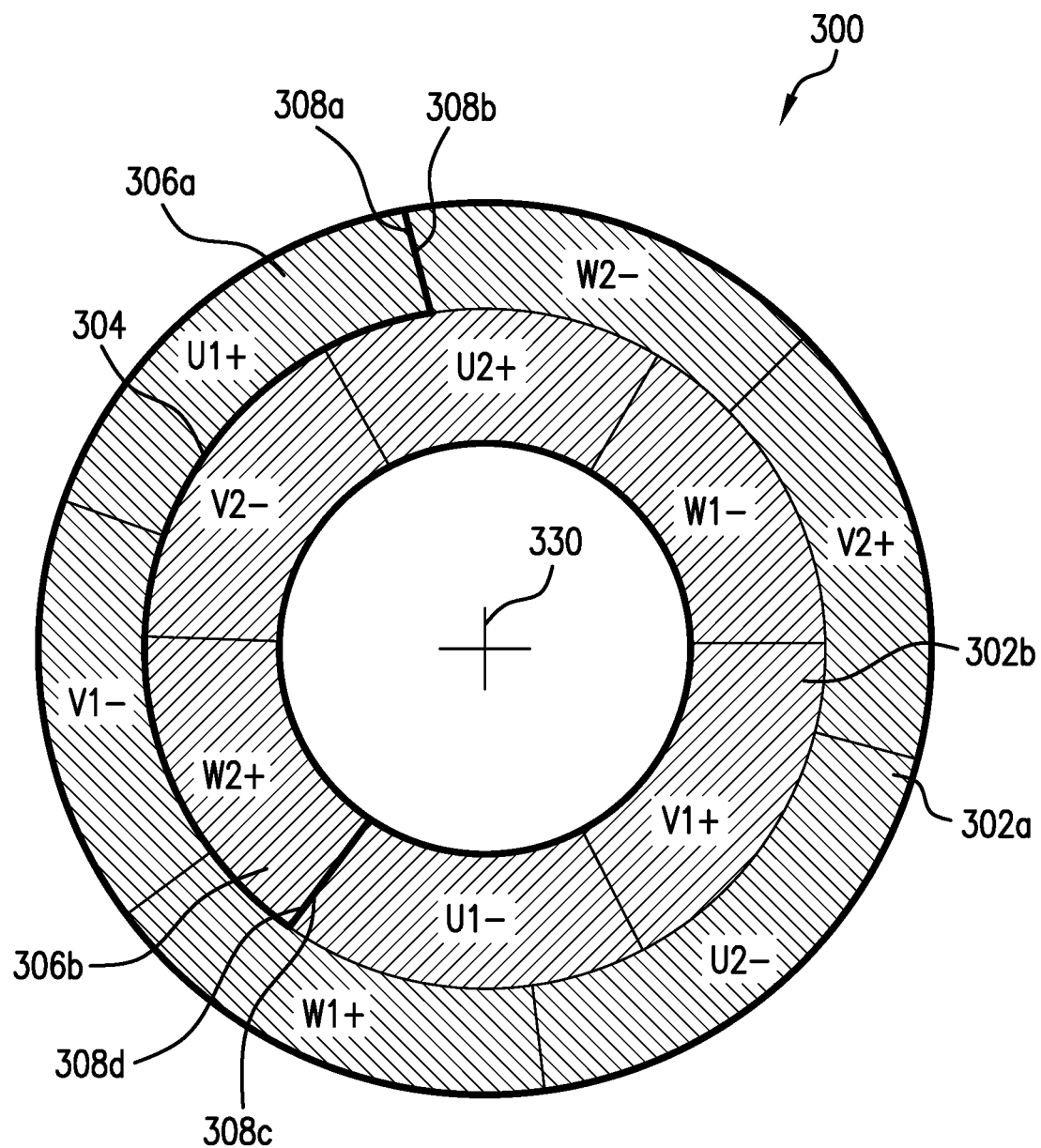
FIG. 4 is a schematic diagram of the winding pack of FIG. 3 rolled into a cylindrical configuration.

Referring to FIG. 4, a schematic cross-section of the winding pack 300 rolled into a cylindrical configuration about a longitudinal axis 330 is shown. The winding pack 300 includes an arrangement of six coils 200 rolled into a 2-layer 302 cylindrical configuration for use in a three-phase electric motor 100. Because the cross sectional area of one side 202a of each coil 200 is substantially the same as the cross sectional area of the other side 202b of the coil, and because each layer 302 includes one side 202 of each coil 200, the cumulative cross-sectional area of each layer 302 is substantially similar. Because the inner layer 302b has a smaller circumference than the outer layer 302a, the cross-sectional area of the inner layer 302b may occupy a smaller circumferential width in the inner layer 302b, causing the inner layer 302b to be thicker than the outer layer 302a.

In some examples, two coils 200 are configured to be electrically connected to each phase of a three-phase power source, either in series or in parallel. The three phases are typically designated by the letters U, V, and W. Here, coils 200a and 200d (designated U1 and U2, respectively) are associated with phase U, coils 200b and 200e (designated V1 and V2, respectively) are associated with phase V, and coils 200c and 200d (designated W1 and W2, respectively) are associated with phase W. Each phase of the three-phase power source (U, V, W) may be electrically connected to one or more leads of the coils 200 associated with that phase. As shown in FIG. 4, electrical current is flowing in the coils 200 at a particular phase of the three-phase power source. Current flowing in a direction into the drawing is designated with a plus sign and current flowing in a direction out of the drawing is designated with a minus sign. Current flows through the ends 204 (not shown) of the coils 200 and returns to flow in the opposite direction in the other side 202 of the coil 200. Thus, FIG. 4 shows current flowing in one direction in one side 202 of each coil 200 and current flowing in the opposite direction in the other side 202 of the same coil 200 (located in the other layer 302 of the winding pack). Here, the current is shown flowing in opposite directions in the two coils 200 associated with each phase in each layer 302. In other words, for each phase of each layer 302 of the example winding pack 300 shown in FIG. 4, current flows into one coil 200 (e.g. U1 200a) and current flows out of one coil 200 (e.g. U2 200d). Therefore, the electromagnetic characteristics of each layer 302 of the example 2-layer winding pack 300 may be comparable to a single-layer winding pack 300 having one coil per phase. Considering the outer layer 302a, current is shown flowing out of the drawing for coil U1 200a and into the drawing for coil U2 200d. The same convention is shown for the other phases (V 200b, 200e and W 200c, 200f) in the outer layer 302a and is mirrored in the inner layer 302b which includes the other sides 202b of the coils 200 of the outer layer 302a.

In the example winding pack 300 shown in FIG. 4, the resulting outer layer 302a includes one side 202a of the coils 200 arranged in the sequence U1, V1, W1, U2, V2, and W2. The inner layer 302b includes the other side 202b of each coil 200 included in the outer layer 302a. The ends 308 of each layer 302 (one side 202 of each coil U1 and W2) are adjacent to each other in the cylindrical configuration. The ends 308a,b of the outer layer 302a are adjacent and the end 308c,d of the inner layer 302b are adjacent. Prior to being rolled into the cylindrical configuration, the end region 306a where the outer layer 302a extended beyond the inner layer 302b may have included one side 202 of coils U1, V1, and part of W1. The end region 306b where the inner layer 302b extended beyond the outer layer 302a may have included one side 202 of coils W2, V2, and part of U2. After being rolled into the cylindrical configuration shown, these end regions 306 of each layer 302 overlap. The ends 308a,b of the outer layer 302a may be secured to each other, e.g., with additional adhesive tape, to maintain the cylindrical configuration.

As shown in the overlap region, one side 202a of coil U1 200a overlaps with the other side 202b of coil U2 200d, one side 202a of coil V1 200b overlaps with the other side 202b of coil V2 200e, and one side 202a of coil W1 200c overlaps with the other side 202b of coil W2 200f. The depicted arrangement of coils 200 may be advantageous because the magnetic fields 206 produced by coils 200 associated with each phase are angularly well aligned. However, other degrees of overlap between the inner and outer layers 306 are within the scope of the invention. Although FIG. 4 shows end regions 306 including between two and three coil sides 202, in some examples, the amount coil sides 202 in the overlapping end regions 306 may be greater or lesser than shown in FIG. 4. For example, the overlapping end regions 306 may include three coil sides 202, resulting in magnetic fields 206 even more well angularly aligned than magnetic fields 206 produced by coils 200 arranged as shown in FIG. 4. As disclosed previously, the electromagnetic characteristics of each layer 302 of the example 2-layer winding pack 300 may be comparable to a single-layer winding pack 300 having one coil 200 per phase. Thus, the total magnetic field 206 in the region of the rotor 102 may be affected by the degree of angular misalignment of the magnetic fields 206 produced by each layer 302 of the winding pack 300. The degree of angular misalignment of the magnetic fields 206 is preferably less than about 15 degrees.

Figure 5:
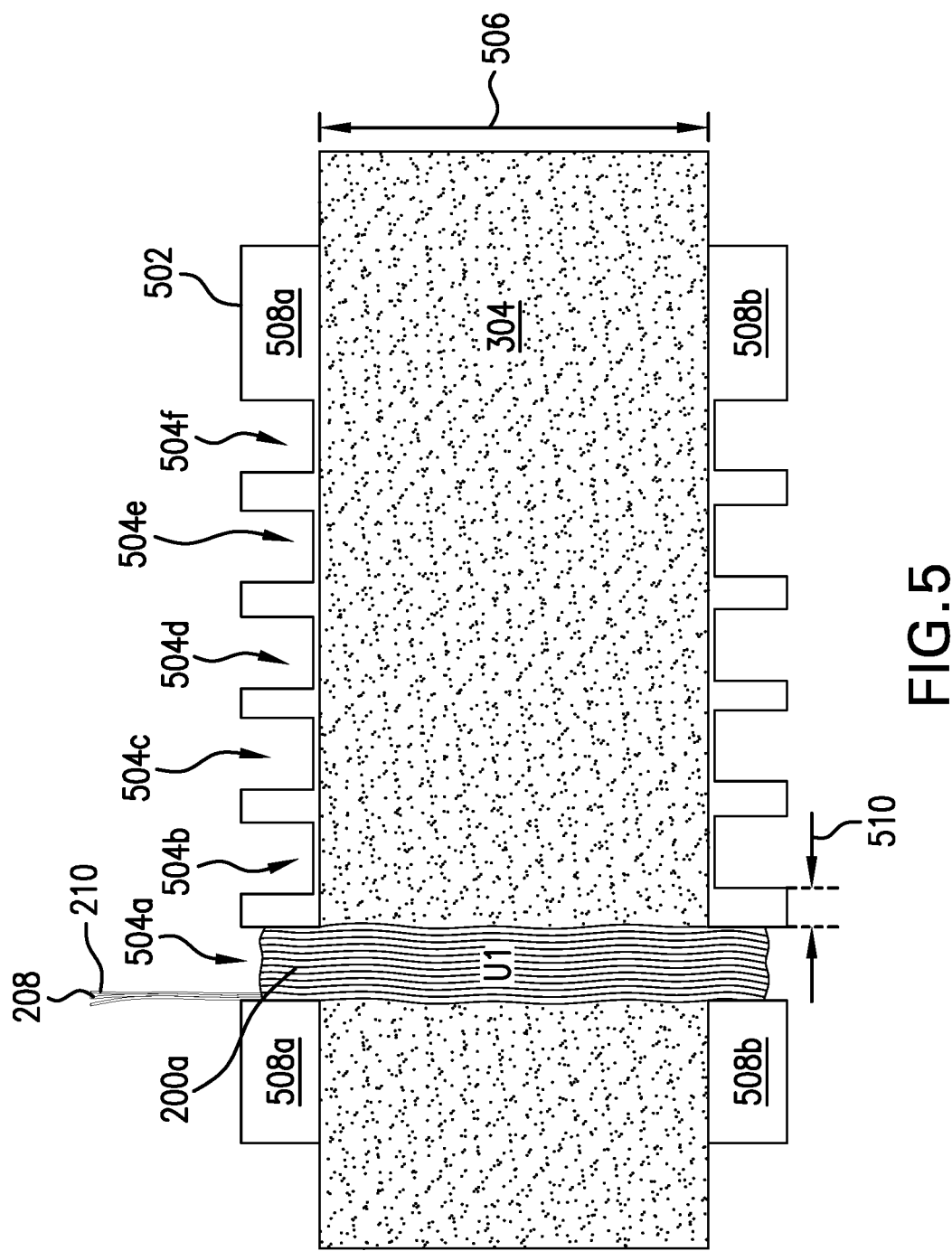
FIGS. 5-7 show steps in an embodiment of a process for making the winding pack of FIG. 3.

FIG. 5 shows an example coil-winding mandrel 502 is shown having winding positions 504, 504a-f for six coils 200. Conductors 210 may be wound around the mandrel 502 for a number of turns to form coils 200 of conductors 210, such as the coil 200 shown in FIG. 2. The coils 200 may be wound around the mandrel 502 leaving a length of one or more conductors 210 available as electrical leads 208 for connecting a power source to the coil 200. Individually wound coils 200 may have two electrical leads 208. In some examples, two or more coils 200 are wound in series so that the two or more series-wound coils 200 have only two leads 208 for connecting a power source to the two or more series-wound coils 200.

Each winding position 504 may include a notch or groove or other structure to facilitate winding coils 200 with conductors 210 in close proximity to each other. In some examples, the winding position 504 is merely an indicated location on the mandrel 502, jig, or fixture around which the conductors 210 may be wound. The length 216 of the coil 200 may be defined by the height 506 of the mandrel 502 at a winding position 504. Here, the length 216 of the coil 200 is at least the distance between upper and lower notches of the mandrel 502 in each winding position 504. In some example, the length 216 of the coil 200 is approximately the length of the stator or the rotor 102 of a motor 100. The minimum width 214 of the coil 200 may be defined by the distance between the front and the back of the mandrel 502 at the winding position 504. In some examples, the width 214 of the coil 200 defines the relative positions of sides 202 of the coils 200 in different layers 302 of a two-layer winding pack 300. The side width 212, or cross-sectional area of the side 202 of the coil 200 may be defined by the number of turns of the conductor 210 wound around the mandrel 502 to form the coil 200. The mandrel 502 may receive the conductors 210 from a source such as a spool of wire. The source of conductors 210 may apply a tension to the conductors 210 received by the mandrel 502, e.g., to facilitate winding the conductors 210 closely together and/or to have a relatively small cross-sectional area, e.g., to provide a compact motor 100 configuration. The mandrel 502 may rotate around an axis to receive the conductors 210 or the mandrel 502 may be stationary, while the source of conductors 210 rotates around the mandrel 502. In some examples, the mandrel 502 is powered by a rotational power source such as a motor while it receives conductors 210.

In some examples, the mandrel 502 receives conductors 210 from more than one source so that more than one coil 200 is wound at the same time. For example, the mandrel 502 may receive conductors 210 from three sources to form the three-phase motor winding pack 300 of FIG. 3. Some coils 200 may be wound in one direction around the mandrel 502, while some other coils 200 may be wound in another direction around the mandrel 502. For example, some coils 200 may be wound in a clockwise direction with respect to the axis of rotation of the mandrel 502, and other coils 200 may be wound in a counterclockwise direction with respect to the same axis of rotation. For example, one set of coils 200 may be would in one direction, e.g., one coil 200 for each phase of a polyphase winding pack 300. Another set of coils 200 may be wound in the other direction, using the same conductor 210 source, so that one coil 200 from the one set and one coil 200 from the other set are associated with each phase, the associated coils 200 being electrically connected in series and wound in opposite directions. In some examples, each set of coils 200 associated with each phase has two leads 208 for connecting a single power source to the set of series-wound coils 200.

Figure 6:
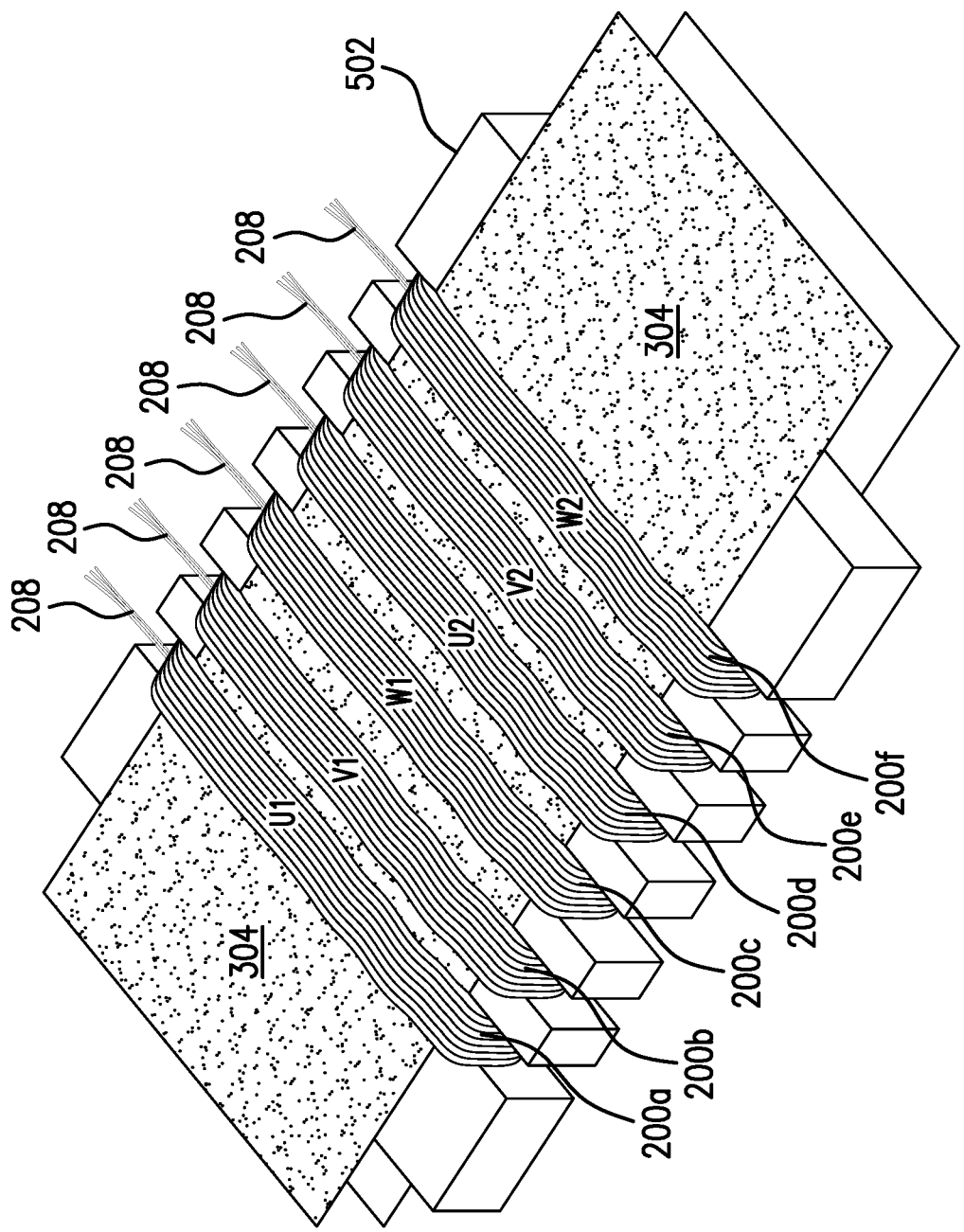
Figure 7:
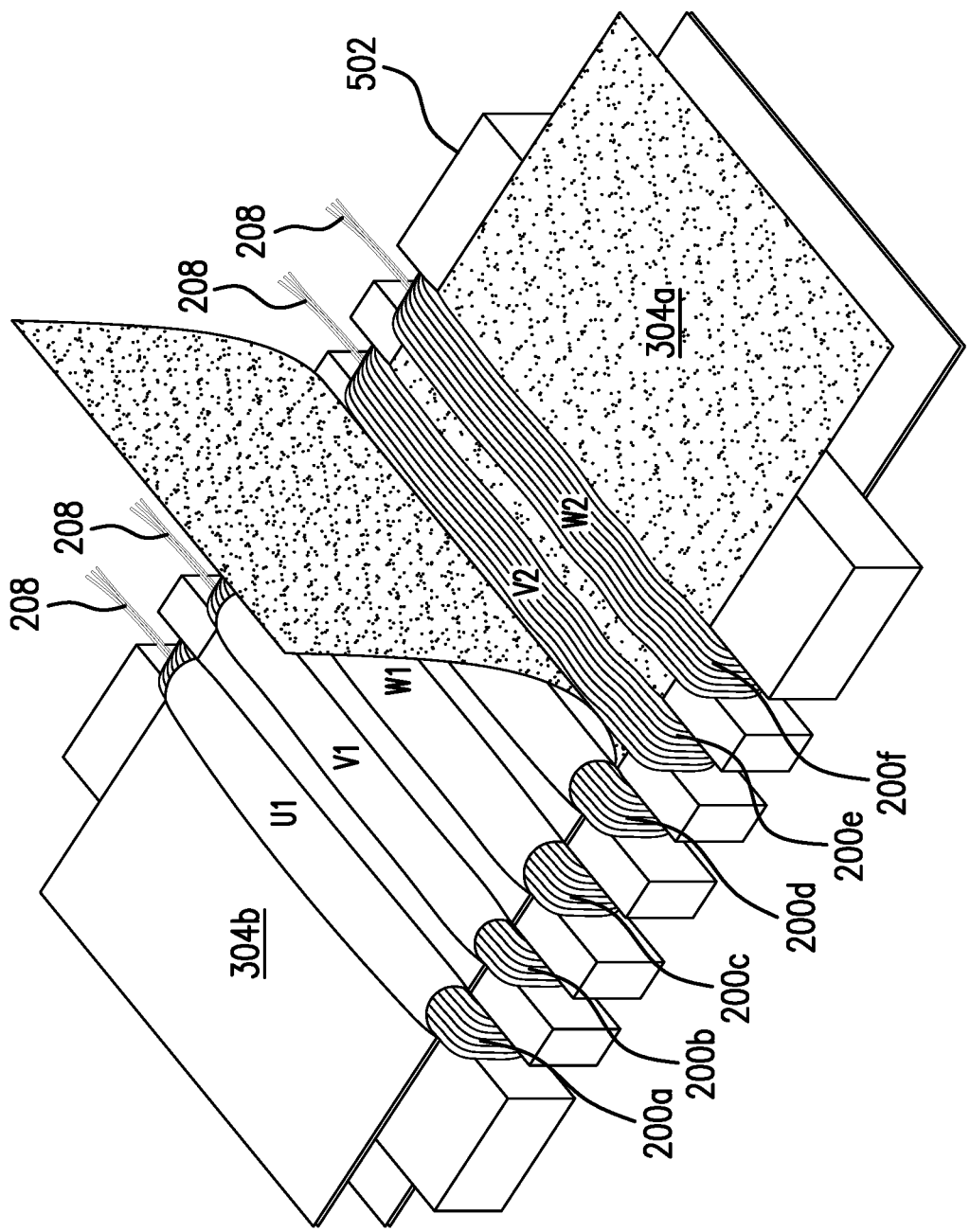

In some examples, a position-maintaining strip of adhesive tape 304 having a single adhesive side is positioned on the mandrel 502 with the adhesive side facing away from the mandrel 502 prior to receiving the conductors 210, so that the conductors 210 are wound around the mandrel 502 and the tape with the conductors 210 adhering to the tape. In some examples, the adhesive tape is positioned on both sides of the mandrel 502 with the adhesive side of the tape facing outward prior to receiving the conductors 210. The adhesive tape may be wrapped around the mandrel 502 so that it adheres to itself with the adhesive side of the tape facing outward. Referring to FIG. 6, the example coil-winding mandrel 502 is shown having six coils 200, 200a-f wound around the mandrel 502 and the adhesive tape. Some of the coils 200 may be wound in each direction. Each of the sides 202 of the coils 200 on one side of the mandrel 502 may form one of the layers 302a of a two-layer winding pack 300, such as the winding pack 300 of FIG. 3, and each of the sides 202 of the coils 200 on the other side of the mandrel 502 may form the other layer 302b of the two-layer winding pack 300. The gap 510 between each of the coils 200 in the winding pack 300 may be defined by the spacing 510 between the six winding positions 504 on the mandrel 502. Referring to FIG. 7, an additional layer of adhesive tape 304 having a single adhesive side may be added to fully surround the conductors 210 and to more securely maintain the relative positions of each side 202 of the coils 200. The additional adhesive tape 304b is positioned with its adhesive side facing the coils 200 and the mandrel 502 so that it adheres to the coils 200 and the adhesive side of the previously applied adhesive tape 304a. The additional tape 304b may be applied around the sides 202 of the coils 200 and may be applied to the previously applied adhesive tape 304a in the spaces between the coils 200 and at either end of the mandrel 502. The additional tape may be positioned around the sides 202 of the coils 200 using a tool designed to press the additional tape closely against and around the sides 202 of the coils 200 and provide extensive contact between the tape and the coil 202 and between the previously applied adhesive tape 304a and the additional tape 304b, with minimal air gaps. FIG. 7 shows the additional tape applied to four of the six coils 200, and shows the additional tape applied to the previously applied tape in three of the spaces between coils 200 and one end of the mandrel 502. The previously applied adhesive tape 304a and the additional adhesive tape 304b preferably have good adhesion with each other to better maintain the position between the sides 202 of the coils 200 when the coils 200 are removed from the mandrel 502.

In some examples, the mandrel 502 may be configured to disassemble to release the coils 200. For example, the mandrel 502 may include an upper and lower spacing element 508a, 508b separated by a removable center section, each spacing element 508 having a series of notches, each notch defining a coil-winding position 504. The mandrel 502 may be disassembled by removing the center section, allowing the upper and lower spacing elements 508 to move toward each other, releasing the coils 200 from the disassembled mandrel 502. In some examples, the released coils 200 form a two-layer 302 winding pack 300, the two layers 302 spaced apart by the width 214 of the coils 200. In some examples, excess tape is trimmed from the winding pack 300 to allow an even more compact configuration. The winding pack 300 may be compressed or flattened to form the winding pack 300 of FIG. 3, e.g., by rotating the coils 200 around an axis parallel to the sides 202 of the coils 200, so that the two layers 302 become adjacent or abut. The winding pack 300 may be further flattened so that at least some conductors 210 of one or both layers 302 overlay and extend into the gaps 510 between sides 202 of the coils 200 of the other layer 302. In some examples, flattening the winding pack 300 forms an irregular inter-layer boundary with some conductors 210 of one layer 302a opportunistically extending into gaps 510 between sides 202 of the coils 200 of the other layer 302b, e.g., to achieve a more compact configuration. The layers 302 may be secured to each other using further adhesive tape. For example, the end 308 of one layer 302a may be secured to the end region 306 of the other layer 302b to maintain the flattened configuration.

Figure 8:
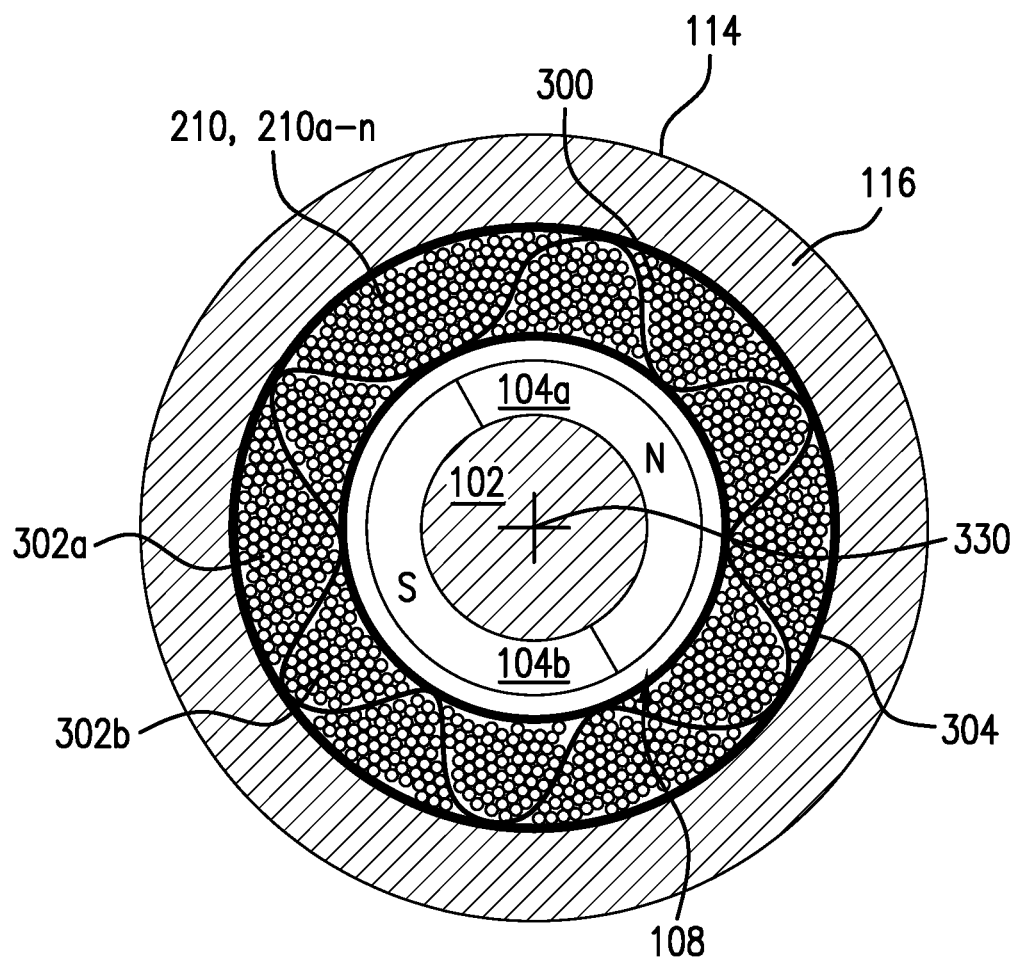
FIG. 8 is a cross-sectional view of the winding pack of FIG. 3 installed in the electric motor of FIG. 1.

FIG. 8 shows the flattened winding pack 300 rolled into the cylindrical configuration of FIG. 4. Here, the winding pack 300 is installed in a slotless, brushless DC motor electric motor 100, such as the motor 100 of FIG. 1. The motor 100 includes a rotor 102 with permanent magnets 104 forming a single (North/South) pole pair. The winding pack 300 forms the stator field winding 300 surrounding the rotor 102 and is separated from the rotor 102 by an air gap 108. The winding pack 300 may be secured in place to laminations 116 surrounding the winding pack 300 and enclosed within the outer case 114. The coils 200 are arranged in a two-layer configuration such that one side 202a of each coil 200 form one layer (shown as an outer layer 302a) of the winding pack 300 and the other side 202b of each coil 200 form the other layer (shown as an inner layer 302b) of the winding pack 300, with the outer and inner layers 302 being generally concentric and abutting. Details are exposed of the conductor 210 arrangement within one side 202 of one of the coils 200. The sides 202 of the coils 200 of the winding pack 300 may be flattened to allow for a compact motor 100 configuration. As shown in FIG. 8, the outer layer 302a may occupy a region which is substantially continuous around the outer circumference of the winding pack 300, the conductors 210 of the outer layer 302a occupying an irregular cross-sectional area after being flattened. In some examples, the sides 202 of coils 200 of the inner layer 302b are at least partially aligned with gaps 510 between sides 202 of coils 200 of the outer layer 302a, the gaps 510 of the outer layer 302a providing opportunity for conductors 210 of the inner layer 302b to expand into. The inner layer 302b may occupy a region which is substantially continuous around the inner circumference of the winding pack 300, the conductors 210 of the inner layer 302b occupying an irregular cross-sectional area after being flattened. Rather than being flattened like the sides 202 of the coils 200, the ends 204 of the coils 200 may be located in available space longitudinally beyond the ends of the magnets 104 of the rotor 102 (not shown) to allow for the compact motor 100 configuration. In some examples, the relative position of each coil 200 included in each layer 302 is maintained by a position-maintaining element 304. Here, the adhesive tape used to fully surround the conductors 210 is shown. The tape extends over and under a portion of the side 202 of each coil 200 included in each layer 302 to maintain the relative position of the sides 202 of each coil 200 within the layer 302. The tape has sufficient flexibility that, after flattening, some conductors 210 in each side 202 may opportunistically occupy a portion of the gap 510 between the sides 202 of the coils 200 in each layer 302, rendering the gap less distinct than before flattening and contributing to the substantially continuous region occupied by each layer 302. In some examples, the epoxy resin is used in addition to or instead of tape to maintain the position of the winding pack 300.

Referring to FIG. 9, a flowchart of a method 900 for forming a polyphase field winding 300 is shown. At step 902, the method 900 includes (for each phase of the polyphase winding 300) winding a conductor 210 for a number of turns in one direction such that each turn of the conductor 210 is adjacent a next turn of the conductor 210 to form a coil 200. The method 900 may include winding the conductor 210 around a winding fixture having one or more winding positions 504. The method 900 may include rotating the winding fixture about its axis for the number of turns. In some examples, the winding fixture includes a spacing element 508 configured to receive electrical conductors 210 and defining a distance between adjacent coils 200 as the electrical conductors 210 are wound. The spacing element 508 may include notches defining the distance between adjacent coils 200. In some examples, the spacing element 508 includes a pair of removable combs separated by a movable center element, wherein removing the coils 200 from the winding fixture comprises moving the center element to allow the pair of combs to move toward each other to release the coils 200 from the winding fixture. In some examples, the method 900 includes applying a position-maintaining element 304, such as adhesive tape, to the winding fixture before winding the conductor 210.

At step 904, the method 900 further includes arranging the formed coils 200 in a sequence, wherein one side 202a of each of the coils 200 is disposed in one layer 302a of the polyphase winding 300 and another side 202b of each of the coils 200 is disposed in another layer 302b of the polyphase winding 300. At step 906, the method 900 further includes applying a position-maintaining element 304 to the coils 200 in each layer 302, the position-maintaining element 304 configured to maintain the relative positions of each of the coils 200 in the sequence within each layer 302. In some examples, the method 900 includes rotating each of the coils 200 around a longitudinal axis (while the position-maintaining element 304 maintains the spacing 510 between adjacent coils 200) to form a winding pack 300, one layer 302a of the winding pack 300 including conductors 210 of one side 202a of each coil 200, another layer 302b of the winding pack 300 including conductors 210 of another layer 302b of the winding pack 300.

In some examples, the method 900 includes rolling the winding pack 300 into a cylindrical configuration, where the longitudinal axis 330 of the cylindrical configuration (see FIGS. 4 and 8) is substantially parallel with a longitudinal axis 320 of the coils 200 (see FIG. 3).

While the invention has been described with specific embodiments, other alternatives, modifications, and variations will be apparent to those skilled in the art. Accordingly, it will be intended to include all such alternatives, modifications, and variations within the spirit and scope of the appended claims.

The invention claimed is:

1. An electric motor polyphase winding pack, comprising:
   a plurality of coiled conductors, each of the coiled conductors corresponding to a phase of a plurality of phases and being wound into a plurality of coils, each of the coils having a first side and a second side, the coils being arranged in a sequence in which:
   all of the first sides are disposed sequentially, spaced from each other by first gaps, in a first layer, and
   all of the second sides are disposed sequentially, spaced from each other by second gaps, in a second layer; and
   a position-maintaining member conforming to at least one of the first or second sides and extending across the first or second gaps to maintain the relative positions of, and spacing between, each of the plurality of coils in the sequence within the first layer or the second layer.

2. The winding pack of claim 1, wherein at least some of the second sides at least partially overlap at least some of the first sides.

3. The winding pack of claim 2, wherein:
   the first sides are spaced from one another by gaps having a gap width; and the second sides have a second side width measured in a direction along the sequence, which second side width is wider than the gap width, such that the at least some second sides each overlap the gaps and the first sides.

4. The winding pack of claim 2, wherein:
the second sides are spaced from one another by gaps having a gap width; and
the first sides have a first side width measured in a direction along the sequence, which first side width is wider than the gap width, such that the at least some first sides each overlap the gaps and the second sides.

5. The winding pack of claim 1, wherein:
each of the first and second layers has opposite first and second ends;
the first and second layers are overlaid against each other;
the first end of the first layer extends beyond the first end of the second layer; and
the second end of the second layer extends beyond the second end of the first layer.

6. The winding pack of claim 5, wherein:
the first layer has a first end region extending beyond the first end of the second layer;
the second layer has a second end region extending beyond the second end of the first layer;
a number of the first sides is disposed in the first end region; and
a same number of the second sides is disposed in the second end region.

7. The winding pack of claim 5, wherein:
the first layer has a first end region extending beyond the first end of the second layer;
the second layer has a second end region extending beyond the second end of the first layer; and
the winding pack is rolled into a configuration having the first and second end regions overlap.

8. The winding pack of claim 7, wherein the winding pack is rolled with:
only the first and second end regions overlapping;
the first and second ends of the first layer disposed circumferentially adjacent each other; and
the first and second ends of the second layer disposed circumferentially adjacent each other.

9. The winding pack of claim 8, wherein the first layer is disposed outside the second layer providing an outer layer, such that the second layer provides an inner layer.

10. The winding pack of claim 9, wherein the at least one of the second sides extends into a gap between the first sides and partially overlaps one of the first sides.

11. The winding pack of claim 10 wherein the first and second layers are separated by an irregular interlayer boundary.

12. The winding pack of claim 5, wherein the first end of the first layer extends beyond the first end of the second layer by a distance defined by a length of an end of a coil.

13. The winding pack of claim 5, wherein some of the first sides are interposed between some of the second sides in the overlaid layers.

14. An electric motor, comprising:
a stator;
a rotor that is movable with respect to the stator and is configured to deliver force produced by the motor;
wherein one of the stator and the rotor includes a plurality of magnets; and
wherein the other of the stator and the rotor includes the winding pack of claim 1 electromagnetically associated with the magnets to produce the force.

15. The electric motor of claim 14, wherein the rotor is rotatable within the stator and is configured to deliver a torque produced by the motor.

16. The winding pack of claim 1, wherein the second layer is disposed adjacent the first layer.

17. The winding pack of claim 1, wherein the position-maintaining member maintains the size of the gaps.

18. The winding pack of claim 1, wherein the position-maintaining member includes:
a first maintaining member associated with first sides; and
a second maintaining member associated with the second sides.

19. The winding pack of claim 18, wherein:
the first maintaining member connects all of the first sides and surrounds each of the first sides, and
the second maintaining member connects all of the second sides and surrounds each of the second sides.

20. The winding pack of claim 19, wherein the first and second maintaining members are free of exposed adhesive at the gaps to maintain the size of the gaps.

21. The winding pack of claim 19, wherein each of the first and second maintaining members includes an outer tape disposed on an exterior of the coils, and an inner tape disposed on the interior of the coils and adhered to the outer tape at the gaps.

22. The winding pack of claim 21, wherein the tapes of the first and second maintaining members include adhesive tapes that adhere to the coils and to each other.

23. A method of winding a polyphase winding, the method comprising:
for each phase of the polyphase winding, winding a first conductor for a number of turns such that each turn of the first conductor is adjacent a next turn of the first conductor to form a coil;
arranging the formed coils in a sequence, wherein a first side of each of the coils is disposed in a first layer of the polyphase winding, spaced from each other by first gaps, and a second side of each of the coils is disposed in a second layer of the polyphase winding, spaced from each other by second gaps; and
applying a position-maintaining element to the coils in the first layer or the second layer conforming to at least one of the first and second sides and extending across the first or second gaps, the position-maintaining element configured to maintain the relative positions of, and spacing between, each of the coils in the sequence within the first layer or the second layer.

24. The method of claim 23, further comprising applying the position-maintaining element to a winding fixture prior to winding the first conductor for the number of turns around the winding fixture to form the coil.

25. The method of claim 23, further comprising rotating each of the coils around a longitudinal axis, the position-maintaining element maintaining the spacing between adjacent coils, to form a winding pack, the first layer of the winding pack comprising conductors of the first side of each coil, the second layer of the winding pack comprising conductors of the second side of each coil.

26. The method of claim 25, further comprising rolling the winding pack into a cylindrical configuration, the longitudinal axis of the cylindrical configuration substantially parallel with the longitudinal axis of the coils.

27. The method of claim 23, wherein the winding fixture comprises a pair of removable combs separated by a movable center element, wherein removing the coils from the winding fixture comprises moving the movable center element to allow the pair of combs to move toward each other to release the coils from the winding fixture.

* * * * *